US 7,131,926 B2

(12) United States Patent
Tiesler et al.

(10) Patent No.: US 7,131,926 B2
(45) Date of Patent: Nov. 7, 2006

(54) MULTIPLE GEAR STAGE AUTOMATIC TRANSMISSION

(75) Inventors: Peter Tiesler, Meckenbeuren (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 51 days.

(21) Appl. No.: 10/930,611

(22) Filed: Aug. 31, 2004

(65) Prior Publication Data

US 2005/0064983 A1  Mar. 24, 2005

(30) Foreign Application Priority Data

Sep. 4, 2003  (DE) ................. 103 40 729

(51) Int. Cl.
*F16H 3/44* (2006.01)
(52) U.S. Cl. ................. 475/282; 475/275; 475/283
(58) Field of Classification Search ........... 475/275, 475/282, 283
See application file for complete search history.

(56) References Cited

U.S. PATENT DOCUMENTS

| | | | |
|---|---|---|---|
| 3,776,066 A | 12/1973 | Piret | |
| 3,977,272 A | 8/1976 | Neumann | |
| 4,070,927 A | 1/1978 | Polak | |
| 4,395,925 A | 8/1983 | Gaus | |
| 4,732,253 A | 3/1988 | Hiramatsu et al. | |
| 4,939,955 A | 7/1990 | Sugano | |
| 5,106,352 A | 4/1992 | Lepelletier | |
| 5,232,411 A | 8/1993 | Hayashi et al. | |
| 5,250,011 A | 10/1993 | Pierce | |
| 5,295,924 A | 3/1994 | Beim | |
| 5,308,295 A | 5/1994 | Michioka et al. | |
| 5,435,792 A | 7/1995 | Justice et al. | |
| 5,439,088 A | 8/1995 | Michioka et al. | |
| 5,460,579 A | 10/1995 | Kappel et al. | |
| 5,520,588 A | 5/1996 | Hall, III | |
| 5,533,945 A | 7/1996 | Martin et al. | |
| 5,536,220 A | 7/1996 | Martin | |
| 5,542,889 A | 8/1996 | Pierce et al. | |
| 5,647,816 A | 7/1997 | Michioka et al. | |
| 5,735,376 A | 4/1998 | Moroto et al. | |
| 6,139,463 A | 10/2000 | Kasuya et al. | |
| 6,471,616 B1 | 10/2002 | Stevenson | |
| 6,558,287 B1 | 5/2003 | Hayabuchi et al. | |
| 6,572,507 B1 | 6/2003 | Korkmaz et al. | |
| 6,634,980 B1 | 10/2003 | Ziemer | |
| 6,723,018 B1 | 4/2004 | Hayabuchi et al. | |
| 6,945,900 B1* | 9/2005 | Usoro et al. | 475/276 |
| 6,976,931 B1* | 12/2005 | Raghavan et al. | 475/296 |

(Continued)

FOREIGN PATENT DOCUMENTS

DE  26 19 895  11/1976

(Continued)

*Primary Examiner*—Rodney H. Bonck
*Assistant Examiner*—David D. Le
(74) *Attorney, Agent, or Firm*—Davis & Bujold, P.L.L.C.

(57) ABSTRACT

A multiple gear transmission having a drive shaft (1) and a driven shaft (2), three planetary gear sets (P1, P2, P3), seven rotatable shafts (1, 2, 3, 4, 5, 6, 7) and seven shifting elements (03, 04, 05, 06, 14, 37, 57) comprising four brakes (03, 04, 05, 06) and three clutches (14, 37, 57). Selective engagement of the seven shifting elements (03, 04, 05, 06, 14, 37, 57) produces, from the drive supplied by the drive shaft (1) via the three planetary gear sets (P1, P2, P3), the seven rotatable shafts (1, 2, 3, 4, 5, 6, 7) and the driven shaft (2), different reduction ratios for eight or nine forward gears and one reverse gear.

32 Claims, 7 Drawing Sheets

U.S. PATENT DOCUMENTS

| | | |
|---|---|---|
| 2002/0091032 A1 | 7/2002 | Hayabuchi et al. |
| 2002/0183160 A1 | 12/2002 | Kao et al. |
| 2003/0060322 A1 | 3/2003 | Raghavan et al. |
| 2003/0083174 A1 | 5/2003 | Tabata et al. |
| 2003/0119623 A1 | 6/2003 | Stevenson et al. |
| 2003/0162625 A1 | 8/2003 | Raghavan et al. |
| 2004/0092357 A1 | 5/2004 | Biermann |
| 2004/0097324 A1 | 5/2004 | Ziemer |
| 2004/0116238 A1 | 6/2004 | Ziemer |

FOREIGN PATENT DOCUMENTS

| | | |
|---|---|---|
| DE | 27 21 719 | 12/1977 |
| DE | 29 36 969 A1 | 4/1981 |
| DE | 38 25 733 A1 | 2/1989 |
| DE | 42 24 360 A1 | 1/1993 |
| DE | 42 24 361 A1 | 1/1993 |
| DE | 43 02 518 A1 | 8/1993 |
| DE | 43 32 466 A1 | 3/1995 |
| DE | 195 24 698 A1 | 2/1996 |
| DE | 197 02 198 A1 | 7/1998 |
| DE | 198 33 376 A1 | 12/1999 |
| DE | 199 12 480 A1 | 9/2000 |
| DE | 199 12 481 A1 | 9/2000 |
| DE | 199 49 507 A1 | 4/2001 |
| DE | 102 00 379 A1 | 8/2002 |
| DE | 101 15 983 A1 | 10/2002 |
| DE | 101 15 986 A1 | 10/2002 |
| DE | 101 15 987 A1 | 10/2002 |
| DE | 102 13 820 A1 | 10/2002 |
| DE | 101 46 606 A1 | 4/2003 |
| DE | 102 50 374 A1 | 6/2003 |
| DE | 101 62 877 A1 | 7/2003 |
| DE | 101 62 883 A1 | 7/2003 |
| DE | 101 62 888 A1 | 7/2003 |
| EP | 0 434 525 A1 | 6/1991 |
| EP | 0 605 953 A1 | 7/1994 |
| EP | 0 719 961 A2 | 7/1996 |
| EP | 1 265 006 A2 | 12/2002 |
| JP | 4290649 | 10/1992 |
| JP | 8200456 | 8/1996 |
| JP | 10259861 | 9/1998 |
| JP | 2000240741 | 9/2000 |
| JP | 2001082555 | 3/2001 |
| JP | 2002323098 | 11/2002 |
| WO | WO-96/01381 | 1/1996 |

* cited by examiner

Variation 1:

| Grading | 1.46 | 1.49 | 1.45 | 1.2 | 1.26 | 1.15 | 1.12 | 1.23 | Spread | 7.5 |
|---|---|---|---|---|---|---|---|---|---|---|
| i-Gear | 3.76 | 2.58 | 1.73 | 1.2 | 1 | 0.8 | 0.69 | 0.62 | 0.5 | -2.71 |
| SE\Gg | 1 | 2 | 3 | 4 | 5 | 6 | 7 | 8 | 9 | R |
| 03 |  | X |  | X |  | X | X | X |  |  |
| 04 | X | X |  |  |  |  |  |  |  | X |
| 17 | X |  |  |  | X |  |  | X |  | X |
| 37 | X | X | X | X | X |  |  |  | X |  |
| 46 |  |  | X |  | X | X | X | X |  | X |
| 56 |  |  |  |  |  |  |  |  | X |  |

Fig. 5

Variation 2:

| Grading | 1.65 | 1.28 | 1.34 | 1.3 | 1.28 | 1.19 | 1.21 | 1.1 | Spread | 7.5 |
|---|---|---|---|---|---|---|---|---|---|---|
| i-Gear | 5.6 | 3.4 | 2.65 | 1.98 | 1.53 | 1.19 | 1 | 0.82 | 0.75 | -1.79 |
| SE\Gg | 1 | 2 | 3 | 4 | 5 | 6 | 7 | 8 | 9 | R |
| 03 | X | X | X | X | X | X |  |  | X | X |
| 04 | X |  | X |  |  |  | X | X |  | X |
| 17 (IAK) |  | X | X | X | X | X | X |  |  |  |
| 37 |  |  |  |  |  |  |  |  | X | X |
| 46 |  |  |  |  |  |  |  | X | X |  |
| 56 | X | X |  |  |  |  |  |  |  |  |

Fig. 6

Variation 3

| Grading | 1.48 | 1.31 | 1.47 | 1.35 | 1.36 | 1.08 | 1.07 | 1.23 | Spread | 7.5 |
|---|---|---|---|---|---|---|---|---|---|---|
| i-Gear | 4.34 | 2.94 | 2.25 | 1.53 | 1.13 | 0.83 | 0.77 | 0.71 | 0.58 | -3.1 |
| SE\Gg | 1 | 2 | 3 | 4 | 5 | 6 | 7 | 8 | 9 | R |
| 03 |  |  | X | X |  |  | X |  | X |  |
| 04 | X | X |  |  |  |  |  | X |  |  |
| 17 | X | X | X |  | X | X |  |  |  |  |
| 37 |  |  |  | X | X | X | X |  |  |  |
| 46 |  |  |  |  |  |  |  | X | X |  |
| 56 | X |  |  |  |  |  |  |  |  |  |

Fig. 7

Variation 4:

| Grading | 1.45 | 1.31 | 1.43 | 1.38 | 1.15 | 1.2 | 1.17 | 1.25 | Spread | 7.5 |
|---|---|---|---|---|---|---|---|---|---|---|
| i-Gear | 4.26 | 2.95 | 2.26 | 1.59 | 1.15 | 1 | 0.83 | 0.71 | 0.57 | -2.89 |
| SE\Gg | 1 | 2 | 3 | 4 | 5 | 6 | 7 | 8 | 9 | R |
| 03 | X |  | X |  |  |  | X | X |  |  |
| 04 |  | X | X |  |  |  | X | X |  |  |
| 17 |  |  |  |  | X | X | X |  |  |  |
| 37 | X |  | X | X | X | X |  |  | X |  |
| 46 |  |  |  |  |  |  |  |  | X |  |
| 56 | X |  |  |  |  |  |  |  |  |  |

Fig. 8

Variation 5:

| Grading | 1.46 | 1.29 | 1.43 | 1.41 | 1.15 | 1.29 | 1.08 | 1.23 | Spread | 7.5 |
|---|---|---|---|---|---|---|---|---|---|---|
| i-Gear | 4.38 | | 2.32 | 1.62 | 1.15 | 1 | 0.77 | 0.72 | 0.59 | -3.1 |
| SE\Gg | 1 | 2 | 3 | 4 | 5 | 6 | 7 | 8 | 9 | R |
| 03 | | | x | | x | | x | x | x | |
| 04 | x | x | x | | | | | | | x |
| 17 | | x | | x | x | x | | x | | x |
| 37 | x | x | x | x | x | x | x | | x | |
| 46 | | | | | | | x | x | x | x |
| 56 | x | | | | | | | | | |

Fig. 9

MULTIPLE GEAR STAGE AUTOMATIC TRANSMISSION

This application claims priority from German Application Serial No. 103 40 729.4 filed Sep. 4, 2003.

FIELD OF THE INVENTION

The invention relates to a multiple gear transmission in planetary design, especially for an automatic transmission of a motor vehicle.

BACKGROUND OF THE INVENTION

According to the prior art, especially for motor vehicles, automatic transmissions comprise planetary gear sets shifted by means of frictional and shifting elements like clutches and brakes and are usually connected with a starting element such as a hydrodynamic torque converter or a fluid clutch liable to a slip effect and optionally provided with a lock-up clutch.

Such a transmission results from EP 0 434 525 A1. Essentially, it comprises one drive shaft and one driven shaft disposed in parallel, one double planetary gear set located concentrically to the drive shaft and five shifting elements in the form of three clutches and two brakes, the optional locking of which by pairs determines different gear ratios between the drive shaft and the driven shaft. This transmission has one front-mounted gear set and two power paths so that by selective engagement by pairs of the five shifting elements six forward gears are obtained.

In the first power path, two clutches are needed here to transmit the torque from the front-mounted gear set to two elements of the double planetary gear set. These are situated in power flow direction essentially behind the front-mounted gear set toward the double planetary gear set. In the second power path, one other clutch is provided which detachably connects them with another element of the double planetary gear set. The clutches are here disposed so that the inner disc carrier forms the output.

From the publication U.S. Pat. No. 6,139,463 a compact multiple gear transmission in planetary design is further known, especially for a motor vehicle, which has two planetary gear sets and one front-mounted gear set, the same as three clutches and two brakes. In this known multiple gear transmission, two clutches C-1 and C-3 are provided in a first power path for transmitting the torque from the front-mounted gear set to the two planetary gear sets. The outer disc carrier, the cylinder or piston and the pressure-compensation sides of the clutch C-3 are here respectively connected with one first brake B-1. Besides, the inner disc carrier of the third clutch C-3 is connected with the cylinder or piston and pressure-compensation sides of the first clutch C-1, the inner disc carrier of the first clutch C-1 being located on the output side and connected with a sun gear of the third planetary gear set.

From the Applicant's DE 199 49 507 A1 is also known a multiple gear transmission where two non-shiftable front-mounted gear sets on the drive shaft are provided which produce two rotational speeds on the output side which, together with the rotational speeds of the drive shaft, can optionally be shifted to the shiftable double planetary gear set acting upon the driven shaft by selective closing of the shifting elements used in a manner, such that to change from one gear to the respective next following higher or lower gear, only one of the two precisely actuated shifting elements has to be engaged or disengaged.

From DE 199 12 480 A1 one automatically shiftable motor vehicle transmission is also known, having three one-spider planetary gear sets, the same as three brakes and two clutches, for shifting six forward gears and one reverse gear and having one drive shaft, the same as one driven shaft. The automatically shiftable motor vehicle transmission is designed so that the drive shaft is directly connected with the sun gear of the second planetary gear set and that the drive shaft can be connected via the first clutch with the sun gear of the first planetary gear set and/or via the second clutch with the spider of the first planetary gear set. Additionally or alternatively, the sun gear of the first planetary gear set can be connected via the first brake with the housing of the transmission and/or the spider of the first planetary gear set via the second brake with the housing and/or the sun gear of the third planetary gear set via the third brake with the housing.

From DE 102 13 820 A1 a multiple gear automatic transmission is further known comprising one first input lane T1 of a first reduction ratio; one input lane T2 having a higher reduction ratio than said input lane T1; one planetary gear set with four elements which are one first element, one second element, one third element and one fourth element in the sequence of elements in a rotational speed diagram; one clutch C2 which transmits a rotation from the input lane T2 to the first element S3; one clutch C-1 which transmits a rotation from the input lane T2 to the fourth element S2; one clutch C-4 which transmits a rotation from the input lane T1 to the first element; one clutch C-3 which transmits the rotation from the input lane T1 to the second element C3; one brake B-1 which produces the engagement of the fourth element; one brake B-2 which produces the engagement of the second element; and one output element which is coupled with the third element R3.

Within the scope of the Applicant's DE 101 15 983 A1 a multiple gear transmission is described, having one drive shaft connected with a front-mounted set, one driven shaft connected with a rear-mounted shifting set and with a maximum of seven shifting elements by optional shifting of which at least seven forward gears can be shifted without group shift. The front-mounted set is formed by one front-mounted planetary set or at most two non-shiftable front-mounted planetary gear sets coupled with the first front-mounted planetary gear set wherein the rear-mounted set is designed as two-spider four-shaft transmission with two shiftable rear-mounted planetary gear sets and has four free shafts. The first free shaft of this two-spider four-shaft transmission is connected with the first shifting element, the second free shaft with the second and third shifting elements, the third free shaft with the fourth and fifth shifting elements and the fourth free shaft with the driven shaft. For a multiple gear transmission having a total of six shifting elements, it is inventively proposed to connect the third free shaft or the first free shaft of the rear-mounted set additionally with a sixth shifting element. For a multiple gear transmission having a total of seven shifting elements, it is inventively additionally proposed to connect the third free shaft with a sixth shifting element (D') and the first free shaft with a seventh shifting element.

Within the scope of the Applicant's DE 101 15 987, a multiple gear transmission has also been described having at least seven gears. The transmission comprises, together with the drive shaft and the driven shaft, one non-shiftable front-mounted gear set and one shiftable rear-mounted gear set in the form of a two-spider four-shaft transmission. The front-mounted gear set consists of one first planetary gear set which, together with the input rotational speed of the drive shaft, offers a second rotational speed which can optionally be shifted to a rear-mounted gear set. The rear-mounted gear set is comprised of two shiftable planetary gear sets which, with the six shifting elements, can engage at least seven gears, two power paths being formed. At the same time, group shifts are always advantageously prevented during each shifting operation. One 9-gear multiple gear transmission has also been disclosed in DE 29 36 969; it comprises eight shifting elements and four gear sets.

Automatically shiftable vehicle transmissions in planetary design have often been described already in the prior art and can be an object of constant further development and improvement. Thus the transmissions must have sufficient number of forward gears, the same as one reverse gear and a ratio very well suited to motor vehicles having a high total spreading and favorable ratio ranges. They must also make a high starting ratio in forward direction and contain a direct gear possible, the same as is adequate for utilization in both passenger cars and in commercial vehicles. Besides, said transmission must have a low construction cost, especially requiring a small number of shifting elements and during sequential shifting mode prevent double shifts so that during gear shifts in defined gear groups only one shifting element be changed each time.

The problem on which this invention is based is to propose a multiple gear transmission of the kind above mentioned in which the construction cost is optimized and, in addition, the degree of efficiency in the main drive gears is improved with regard to towing and gearing losses. Besides, in the inventive multiple gear transmission low torques act on the shifting elements and planetary gear sets, and the rotational speeds of the shafts, shifting elements gear sets are kept as low as possible. In addition, the number of gears and the spreading of the transmission must be increased so that eight or nine forward gears and one reverse gear can be advantageously implemented. The inventive transmission must also be adequate for any manner of installation in a vehicle, particularly for front-transverse or a standard arrangement.

SUMMARY OF THE INVENTION

A multiple gear transmission in planetary design is accordingly proposed which comprises one drive shaft and one driven shaft located in one housing, three planetary gear sets, at least seven rotatable shafts and at least six shifting elements including brakes and clutches the selective engagement of which produces different reduction ratios between the drive shaft and the driven shaft so that eight or nine forward gears and one reverse gear can be implemented.

The drive shaft is here connected with the spider of the first planetary gear set and via one clutch detachably connectable with a seventh shaft which is connected with the sun gear of the second planetary gear set, the driven shaft is connected with the ring gear of the second planetary gear set and the spider of the third planetary gear set, one third shaft is, on one side, connected with the sun gear of the first planetary gear set and, on the other side, attachable via one brake to the housing G and via one clutch detachably connectable with the seventh shaft. One fifth shaft is, in addition, connected with the ring gear of the first planetary gear set and the sun gear of the third planetary gear set and detachably connectable via one clutch with a sixth shaft. The sixth shaft is here connected with the spider of the second planetary gear set and via one clutch detachably connectable with a fourth shaft connected with the ring gear of the third planetary gear set, the fourth shaft being attachable to the housing G via one brake.

By virtue of the inventive configuration of the multiple gear transmission adequate ratios result, the same as a considerable increase in the total spreading of the multiple gear transmission, whereby an improvement of the driving comfort and an important reduction in consumption are obtained.

The inventive multiple gear transmission is suitable for any motor vehicle, in particular for passenger cars and for commercial vehicles such as wagons, autobuses, construction vehicles, rail vehicles, chain tractor vehicles and the like.

With the inventive multiple gear transmission, a small number of shifting elements, preferably four brakes and three clutches, further considerably reduces the construction cost. It is advantageously possible with the inventive multiple gear transmission to start with a hydrodynamic torque converter, an external starting clutch or also any adequate external starting element. It is also conceivable to make a starting operation possible with a starting element integrated in the transmission. Preferably adequate is a shifting element actuated in the low gears and in the reverse gear.

With the multiple gear transmission invention, there also results a good degree of efficiency in the main drive gears relative to towing and gearing losses.

Besides, torques in the shifting elements and in the planetary gear sets of the multiple gear transmission are low whereby the wear in the multiple gear transmission is advantageously reduced. The low torques further make a correspondingly small dimensioning possible whereby the needed installation space and attendant costs are reduced. In addition, the rotational speeds in the shafts, the shifting elements and the planetary gear sets are low.

The inventive transmission is, in addition, designed so as to make an adaptability to different drive line structures possible both in power flow direction and with regard to space.

BRIEF DESCRIPTION OF THE DRAWINGS

The invention will now be described, by way of example, with reference to the accompanying drawings in which:

FIG. 5 is a first switch system for the inventive multiple gear transmission according to FIGS. 1, 2, 3 or 4;

FIG. 6 is a second switch system for the inventive multiple gear transmission according to FIGS. 1, 2, 3 or 4;

FIG. 7 is a third switch system for the inventive multiple gear transmission according to FIGS. 1, 2, 3 or 4;

FIG. 8 is a fourth switch system for the inventive multiple gear transmission according to FIGS. 1, 2, 3 or 4;

FIG. 9 is one other switch system for the inventive multiple gear transmission according to FIGS. 1, 2, 3 or 4;

DETAILED DESCRIPTION OF THE INVENTION

Figure 1:
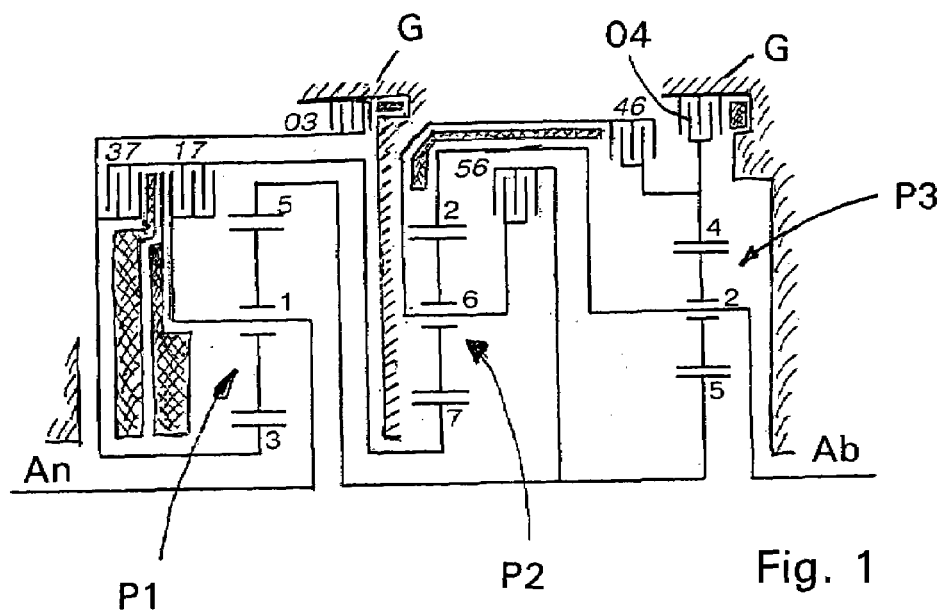
FIG. 1 is a diagrammatic view of a preferred embodiment of the inventive multiple gear transmission corresponding to a standard arrangement.

In FIGS. 1, 2, 3 and 4 is shown an inventive multiple gear transmission having one drive shaft 1 (An) and one driven shaft 2 (Ab) located in one housing G. Three planetary gear sets P1, P2, P3 are provided preferably designed as minus planetary gear sets.

As can be seen from FIGS. 1 to 4, only six shifting elements, namely, two brakes 03, 04 and four clutches 17, 37, 46 and 56 are provided.

With the shifting elements, a selective gear shift of nine forward gears and one reverse gear can be implemented; three shifting elements being always closed. The inventive multiple gear transmission has a total of seven rotatable shafts, namely, shafts 1, 2, 3, 4, 5, 6 and 7.

It is provided in the inventive multiple gear transmission that the input results by the shaft 1, which is permanently connected with the spider of the first planetary gear set P1 and—in power flow direction behind the spider of the first planetary gear set P1—detachably connectable via one clutch 17 with the shaft 7 which is connected with the sun gear of the second planetary gear set P2. The shaft 3 is, on one side, connected with the sun gear of the first planetary gear set P1 and, on the other side, attachable to the housing G via one brake 03; it is also detachably connectable with the shaft 7 via a clutch 37 in an area between the sun gear of the first planetary gear set P1 and the brake 03. One shaft 5 is further provided which is connected with the ring gear of the first planetary gear set P1 and the sun gear of the third planetary gear set P3, the shaft 5 being detachably connectable via a clutch 56 with one shaft 6 which, in turn, is connected with the spider of the second planetary gear set P2 and detachably connectable via one clutch 46 with a shaft 4 connected with the ring gear of the third planetary gear set P3. According to the invention, the shaft 4 is also attachable to the housing G via one brake 04.

The output results via the shaft 2 which is connected with the ring gear of the second planetary gear set P2 and the spider of the third planetary gear set P3. In the inventive multiple gear transmission, no shaft is permanently connected with the housing. The spatial arrangement of the shifting elements and, should that be the case, of the servo devices thereof, can be arbitrary limited only by dimensions and outer molding.

Figure 2:
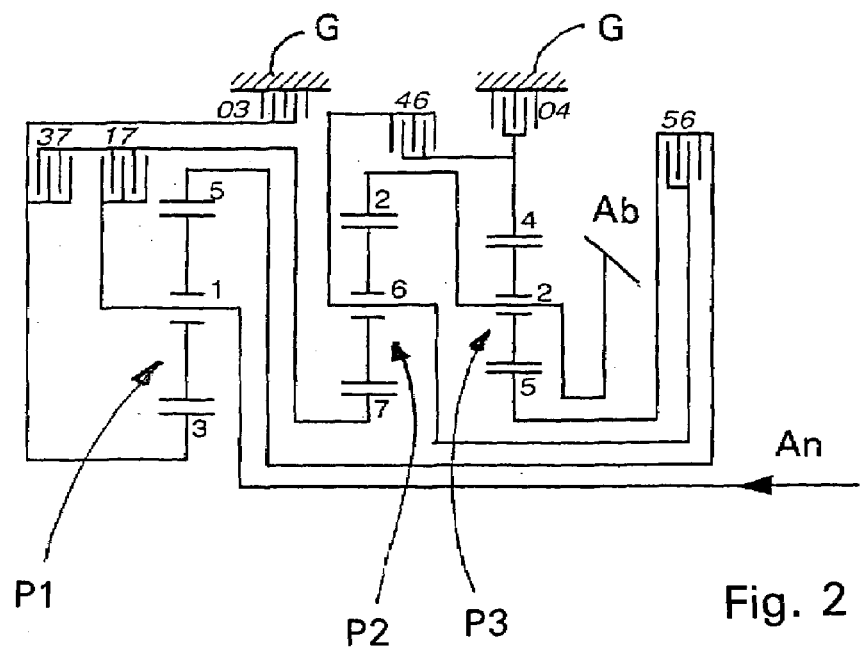
FIG. 2 is a diagrammatic view of another preferred embodiment of the inventive multiple gear transmission adequate for transverse installation.
Figure 3:
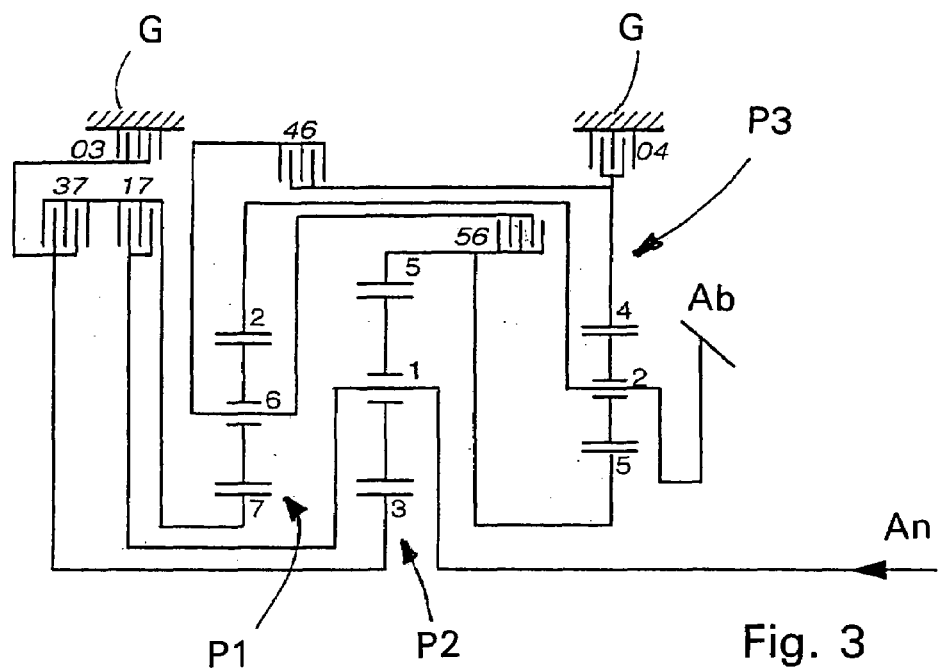
FIG. 3 is a diagrammatic view of one other preferred embodiment of an inventive multiple gear transmission adequate for transverse installation.

As can be seen from FIGS. 1, 2 and 3, the clutches 37, 17, 56 and 46, radially observed, can be disposed approximately above the planetary gear sets P1, P2, P3. According to FIGS. 1, 2, and 3, the clutches 37 and 17 are preferably disposed side by side and—for the case of multi-disc clutches—can have one common outer disc carrier. The arrangement of the first and of the second planetary gear sets can also vary, as it results, for example, from the comparison of the arrangements in FIGS. 2 and 3. From a spatial viewpoint, the clutch 56 can also be located on the side of the output.

Figure 4:
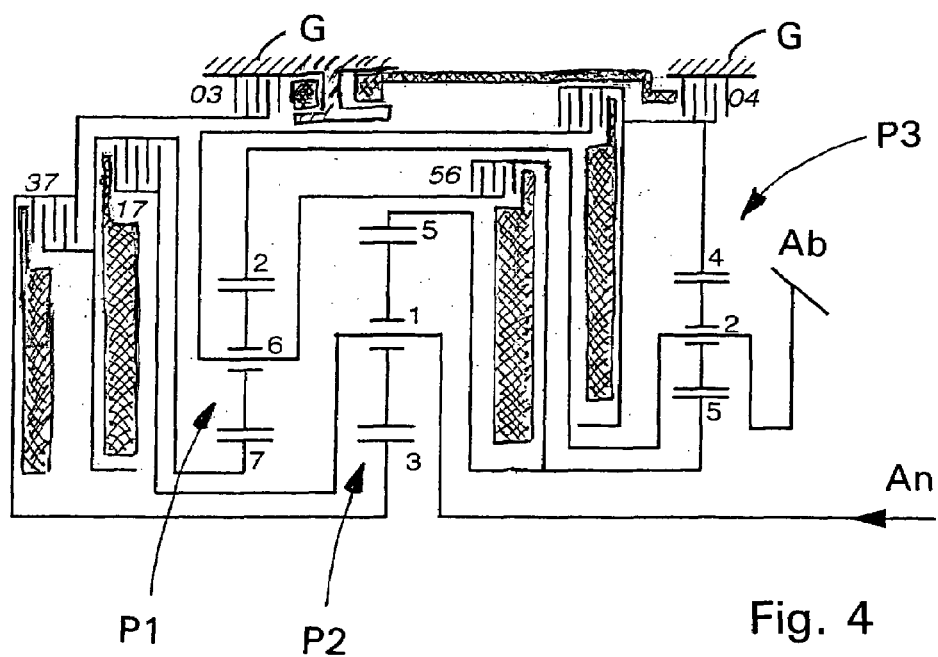
FIG. 4 is a diagrammatic view of another preferred embodiment of na inventive multiple gear transmission adequate for front-transverse installation.

Within the scope of the embodiment shown in FIG. 4, the clutches 37 and 17 are not disposed side by side, it being also possible according to the invention, for example, to situate the clutch 37, radially observed, above the clutch 17. It is, likewise, possible that, radially observed, the clutch 46 be approximately above the clutch 56 or also above the central planetary gear set P1.

In FIG. 5 is shown a first alternative of a switch system of the inventive multiple gear transmission according to FIGS. 1 to 4. From the switch system can be inferred, by way of example, the respective ratios i of the individual gear steps and the ratio ranges to be determined therefrom. It can also be inferred from the switch system that in sequential shifting mode double gear shifts or group gear shifts are prevented, since two adjacent gear steps respectively use two shifting elements in common. As is to be recognized from the switch system, it is also possible, without group gear shift, to skip gears (for example, 6–8). The sixth gear is here designed as a direct gear. As is also to be understood from the switch system, 3 shifting elements are always closed, which has a positive effect with regard to towing losses.

The brake 04, the clutch 17 and the clutch 37 are closed for the first gear. The brake 03, the brake 04 and the clutch 37 form the second gear. The brake 04 and the clutches 37 and 36 are activated for the third gear; the fourth gear needs the brake 03 and the clutches 37 and 46. The clutches 17, 37 and 46 are closed for the fifth gear; the clutches 17 and 46 and the brake 03 are closed in the sixth gear. For the seventh gear, the brake 03 and the clutches 46 and 56 are closed and for the eighth gear the brake 03 and the clutches 17 and 56. The ninth gear is shifted by the closing of the brake 03 and of the clutches 37 and 56. In the reverse gear R, the brake 04 and the clutches 17 and 46 are activated.

In FIG. 6 is shown a second alternative of a switch system of the inventive multiple gear transmission according to FIGS. 1 to 4. Here the brake 04 is always closed for the first five gears. The clutches 17 and 56 for the first gear; the clutches 37 and 56 for the second gear; the clutches 17 and 37 for the third gear; the clutch 37 and the brake 03 for the fourth gear and the clutches 37 and 46 for the fifth gear are additionally closed. The clutch 46 is always closed for the gears six to nine. In addition, the clutch 37 and the brake 03 for the sixth gear; the clutch 17 and the clutch 37 for the seventh gear; the brake 03 and the clutch 17 for the eighth gear and the brake 03 and the clutch 56 for the ninth gear are closed. For the reverse gear, the clutches 17 and 46 and the brake 04 are closed.

According to the invention, it is preferably possible in this switch system to start with an integrated shifting element (IAK). The clutch 17 is especially suitable for this since, in the first gear and in the reverse gear, it is all the same needed without reversal of direction of rotation.

FIG. 7 shows another switch system. The clutch 37 is always closed for the first five gears. Additionally, the brake 04 and the clutch 56 for the first gear; the brake 04 and the clutch 17 for the second gear; the brakes 03 and 04 for the third gear; the clutch 46 and the brake 04 for the fourth gear and the clutch 46 and the brake 03 for the fifth gear are closed. The brake 03 is always closed for the gears six to nine. The clutches 17 and 46 for the sixth gear; the clutch 46 and the clutch 56 for the seventh gear; the clutch 56 and the clutch 17 for the eighth gear and the clutches 37 and 56 for the ninth gear are additionally closed. The clutches 17 and 46 and the brake 04 are closed for the reverse gear.

In the switch system, according to FIG. 8, the clutch 37 is always closed for the first six gears. In addition, the brake 04 and the clutch 56 for the first gear; the brake 04 and the clutch 17 for the second gear; the brakes 03 and 04 for the third gear; the clutch 46 and the brake 04 for the fourth gear; the clutch 46 and the brake 03 for the fifth gear and the clutches 17 and 46 for the sixth gear are closed. For the gears seven to nine, the brake 03 is always closed. Besides, the clutches 17 and 46 are closed for the seventh gear, the clutch 56 and the clutch 17 for the eighth gear and the clutches 37 and 56 for the ninth gear. The clutches 17 and 46 and the brake 04 are closed for the reverse gear.

Shown in FIG. 9, the switch system differs from the switch system of FIG. 8 by the gears six and 7; the sixth gear is formed by the clutches 37, 46 and 56 and the seventh gear by the brake 03 and the clutches 46 and 56.

As can be seen in FIGS. 5 to 9, a large spreading results in the inventive transmission. Besides, the ratio ranges in the upper gears are advantageously small whereby a power-oriented driving is made possible. The acceleration behavior of the vehicle is further favored by the large ratio steps in the first three gears.

Due to the small ratio ranges between the sixth and the seventh gears and between the seventh and the eighth gear, the inventive transmission can also be designed as an eight-gear transmission.

With the same transmission diagram, pursuant to shifting logic, different ratio ranges result according to the invention so that a variation specific to utilization or vehicle is possible.

Figure 16:
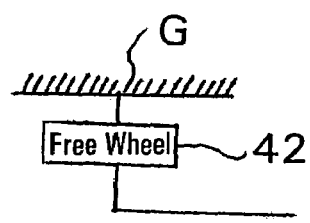
FIG. 16 is a diagrammatic view of an embodiment of the inventive multiple gear transmission having a free wheel.

It is also possible, as shown in FIG. 16, to provide on every adequate place of the multiple gear transmission a conventional free wheel(s), for example, between one shaft and the housing G or, should that be the case, in order to connect two shafts.

Figure 10:
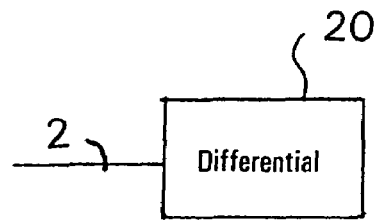
FIG. 10 is a diagrammatic view of an embodiment of the inventive multiple gear transmission having a differential.

As already explained, it is also possible by the inventive design, preferably for transverse, front, longitudinal, rear-longitudinal or all-gear arrangements, to situate the input and the output on the same side of the transmission or of the housing. Upon the input side or upon the output side can also be placed, as shown in FIG. 10 one axle differential and/or one transfer differential 20.

Figure 11:
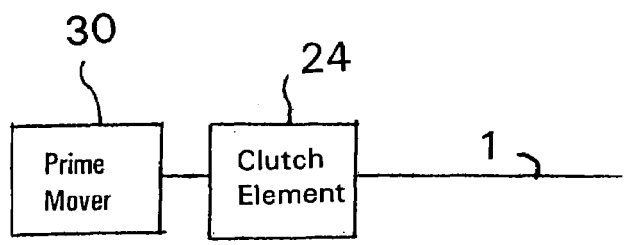
FIG. 11 is a diagrammatic view of an embodiment of the inventive multiple gear transmission with a clutch and a prime mover.
Figure 12:
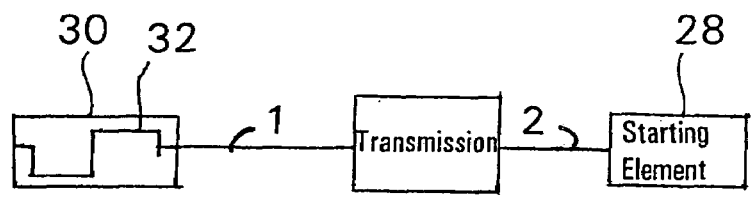
FIG. 12 is a diagrammatic view of an embodiment of the inventive multiple gear transmission having the transmission located between a starting element and a prime mover.
Figure 13:
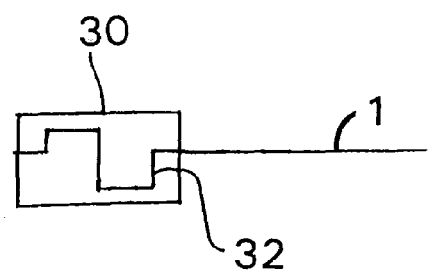
FIG. 13 is a diagrammatic view of an embodiment of the inventive multiple gear transmission for a front-transverse installation with a prime mover.

Within the scope of an advantageous development, the drive shaft 1 can be separated as needed from a prime mover by a clutch element 24, as shown in FIG. 11, it being possible to use as the clutch element one hydrodynamic converter, one hydraulic clutch, one dry starting clutch, one wet starting clutch, one magnetic powder clutch or one centrifugal clutch. It is also possible to situate, as shown in FIG. 12, such a starting element 28 in a power flow direction behind the transmission, the drive shaft 1 being, in this case, permanently connected with the crankshaft 32 of the engine or prime mover 30, as shown in FIG. 13.

Figure 14:
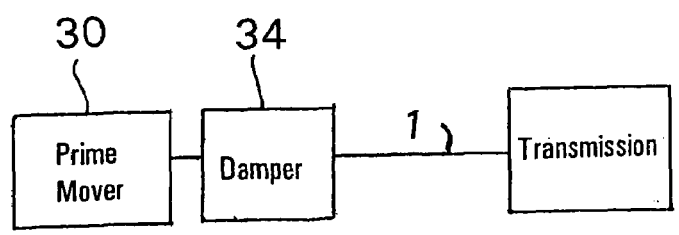
FIG. 14 is a diagrammatic view of an embodiment of the inventive multiple gear transmission having a prime mover and a damper.

The inventive multiple gear transmission, as shown in FIG. 14, also makes situating a torsional vibration damper 34 between engine or prime mover 30 and transmission possible.

Figure 15:
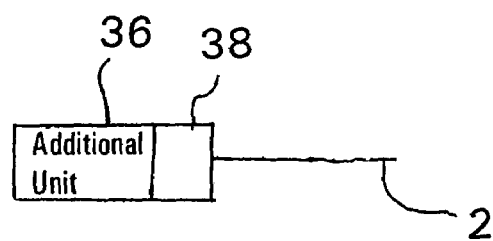
FIG. 15 is a diagrammatic view of an embodiment of the inventive multiple gear transmission with a power take off for an additional unit.
Figure 18:
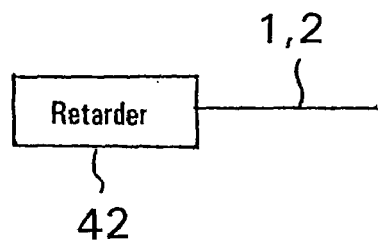
FIG. 18 is a diagrammatic view of a preferred design of the inventive multiple gear transmission having a retarder.

Within the scope of another embodiment of the invention, there can be placed, preferably upon the drive shaft 1 or the driven shaft 2, one wear-free brake such as a hydraulic or electric retarder 42 or the like, as shown in FIG. 18, which is of particular importance for use in commercial vehicles. Besides, as shown in FIG. 15, for the driving of an additional unit 36, a power takeoff 38 can be provided upon each shaft, preferably upon the drive shaft 1 or the driven shaft 2.

The shifting elements used can be designed as power shiftable clutches or brakes. Force-locking clutch brakes, such as multi-disc clutches, band brakes and/or tapered clutches, can especially be used. Force-locking brakes and/or clutches such as synchronizers or dog clutches can also be used as shifting elements.

Figure 17:
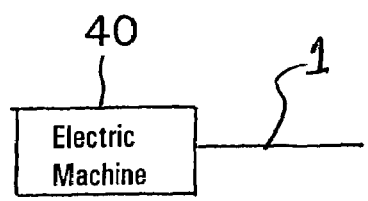
FIG. 17 is a diagrammatic view of an embodiment of the inventive multiple gear transmission with an electric machine.

Another advantage of the multiple gear transmission introduced here is that an electric machine 40 can be mounted on each shaft as generator and/or as added prime mover, as shown in FIG. 17.

Every constructional design, especially every spatial arrangement of the planetary gear sets and of the shifting elements per se, the same as with each other, and as far as technically logical obviously falls also under the scope of protection without affecting the operation of the transmission even if those designs have not been explicitly shown.

REFERENCE NUMERALS 1 shaft 03 brake
2 shaft 04 brake
3 shaft 17 clutch
4 shaft 37 clutch
5 shaft 46 clutch
6 shaft 56 clutch
7 shaft An input
P1 planetary gear set Ab output
P2 planetary gear set i ratio
P3 planetary gear set G housing
IAK integrated shifting element

The invention claimed is:

1. A multiple gear transmission of a planetary design for an automatic transmission of a motor vehicle, comprising a drive shaft (1) and a driven shaft (2) located in a housing (G), first, second and third planetary gear sets (P1, P2, P3),
third, fourth, fifth, sixth and seventh rotatable shafts (3, 4, 5, 6, 7), and
first, second, third, fourth, fifth and sixth shifting elements (03, 04, 17, 37, 46, 56) comprising first and second brakes (03, 04) and first, second, third and fourth clutches (17, 37, 46, 56), and selective engagement of the six shifting elements (03, 04, 17, 37, 46, 56) produces different reduction ratios between the drive shaft (1) and the driven shaft (2) so that up to nine forward gears and one reverse gear can be implemented,
wherein the drive shaft (1) is permanently connected with a spider of the first planetary gear set (P1) and detachably connectable, via the first clutch (17), with the seventh shaft (7) which is connected with a sun gear of the second planetary gear set (P2),
the driven shaft (2) is connected with a ring gear of the second planetary gear set (P2) and a spider of the third planetary gear set (P3), the third shaft (3) is, adjacent one end, connected with a sun gear of the first planetary gear set (P1) and, adjacent a second end, attachable to the housing (G), via the first brake (03), and detachably connectable with the seventh shaft (7), via the second clutch (37), the fifth shaft (5) is connected with a ring gear of the first planetary gear set (P1) and a sun gear of the third planetary gear set (P3) and the fifth shaft (5) is, via the fourth clutch (56), detachably connectable with the sixth shaft (6) which is connected with a spider of the second planetary gear set (P2) and, via the third clutch (46), is detachably connectable with the fourth shaft (4) connected with a ring gear of the third planetary gear set (P3), and the fourth shaft (4) is attachable to the housing (G) via the second brake (04).

2. The multiple gear transmission according to claim 1, wherein the forward gears are shiftable so that during a gear change from one forward gear to a sequentially higher gear or a sequentially lower gear only one previously engaged shifting element is disengaged and only one previously unengaged shifting element is engaged.

3. The multiple gear transmission according to claim 1, wherein for each of the forward gears and for the reverse gear, only three of the at least six shifting elements are engaged at any given time.

4. The multiple gear transmission according to claim 1, wherein the transmission has nine forward gears and for the first forward gear the second, the third and the fourth shifting elements (04, 17, 37) are engage, for the second forward gear the first the second and the fourth shifting elements (03, 04, 37) are engaged, for the third forward gear the second, the fourth and the fifth shifting elements (04, 37, 46) are engaged, for the fourth forward gear the first, the fourth and the fifth shifting elements (03, 37, 46) are engaged, for the fifth forward gear the third, the fourth and the fifth shifting elements (17, 37, 46) are engaged, for the sixth forward gear the first, the third and the fifth shifting elements (03, 17, 46) are engaged, for the seventh forward gear the first, the fifth and the sixth shifting elements (03, 46, 56) are engaged, for the eighth forward gear the first, the third and the sixth shifting elements (03, 17, 56) are engaged and for the ninth forward gear the first, the fourth and the sixth shifting elements (03, 37, 56) are engaged.

5. The multiple gear transmission according to claim 1, wherein the transmission has nine forward gears and for the first forward gear the second, the third and the sixth shifting elements (04, 17, 56) are engaged, for the second forward gear the second the fourth and the sixth shifting elements (04, 37, 56) are engaged for the third forward gear the second, the third and the fourth shifting elements (04, 17, 37) are engaged, for the fourth forward gear the first the second and the fourth shifting elements (03, 04, 37) are engaged, for the fifth forward gear the second the fourth and the fifth shifting elements (04, 37, 46) are engaged, for the sixth forward gear the first the fourth and the fifth shifting elements (03, 37, 46) are engaged, in the seventh forward gear the third the fourth and the fifth shifting elements (17, 37, 46) are engaged for the eighth forward gear the first the third and the fifth shifting elements (03, 17, 46) are engaged and for the ninth forward gear the first the fifth and the sixth shifting elements (03, 46, 56) are engaged.

6. The multiple gear transmission according to claim 1, wherein the transmission has nine forward gears and for the first forward gear the second, the fourth and the sixth shifting elements (04, 37, 56) are engaged, for the second forward gear the second, third and the fourth shifting elements (04, 17, 37) are engaged, for the third forward gear the first, the second and the fourth shifting elements (03, 04, 37) are engaged, for the fourth forward gear the second the fourth and the fifth shifting elements (04, 37, 46) are engaged, for the fifth forward gear the first, the fourth and the fifth shifting elements (03, 37, 46) are engaged, for the sixth forward gear the first, the third and the fifth shifting elements (03, 17, 46) are engaged, for the seventh forward gear the first, the fifth and the sixth shifting elements (03, 46, 56) are engaged, for the eighth forward gear the first, the third and the sixth shifting elements (03, 17, 56) are engaged and for the ninth forward gear the first, the fourth and the sixth shifting elements (03, 37, 56) are engaged.

7. The multiple gear transmission according to claim 1, wherein for the first forward gear the second, the fourth and the sixth shifting elements (04, 37, 56) are engaged, for the second forward gear the second, the third and the fourth shifting elements (04, 17, 37) are engaged, for the third forward gear the first, the second and the fourth shifting elements (03, 04, 37) are engaged, for the fourth forward gear the second, the fourth and the fifth shifting elements (04, 37, 46) are engaged, for the fifth forward gear the first, the fourth and the fifth shifting elements (03, 37, 46) are dosed engaged, for the sixth forward gear the third, fourth and the fifth shifting elements (17, 37, 46) are engaged, for the seventh forward gear the first, the third and the fifth shifting elements (03, 17, 46) are engaged, for the eighth forward gear the first, the third and the sixth shifting elements (03, 17, 56) are engaged and for the ninth forward gear the first, the fourth and the sixth shifting elements (03, 37, 56).

8. The multiple gear transmission according to claim 1, wherein the transmission has nine forward gears and for the first forward gear the second, the fourth and the sixth shifting elements (04, 37, 56) are engaged, for the second forward gear the second the third and the fourth shifting elements (04, 17, 37) are engaged, for the third forward gear the first, the second and the fourth shifting elements (03, 04, 37) are engaged, for the fourth forward gear the second, the fourth and the fifth shifting elements (04, 37, 46) are engaged, for the fifth forward gear the first, the fourth and the fifth shifting elements (03, 37, 46) are closed engaged, in for the sixth forward gear the fourth, the fifth and the sixth shifting elements (37, 46, 56) are closed engaged, for the seventh forward gear the first, the fifth and the sixth shifting elements (03, 46, 56) are engaged, in the eighth forward gear the first, the third and the sixth shifting elements (03, 17, 56) are engaged and in for the ninth forward gear the first, the fourth and the sixth shifting elements (03, 37, 56) are engaged.

9. The multiple gear transmission according to claim 1, wherein for the reverse gear the second, the third and the fifth shifting elements (04, 17, 46) are engaged.

10. The multiple gear transmission according to claim 1, wherein, when radially observed, the first, the second, the third and the fourth clutches (37, 17, 56, 46) are situated radially further away from a rotational axis of the drive shaft (1) than the first, the second and the third planetary gear sets (P1, P2, P3).

11. The multiple gear transmission according to claim 1, wherein the fourth clutch (56) is situated on an input side of the transmission.

12. The multiple gear transmission according to claim 1, wherein the second clutch (37) is situated further away from the first planetary gear sets (P1) than the first clutch (17).

13. The multiple gear transmission according to claim 1, wherein, when radially observed, the third clutch (46) is situated approximately radially further away from a rotational axis of the drive shaft (1) than at least one of the fourth clutch (56) and the first and the second planetary gear sets (P1, P2).

14. The multiple gear transmission according to claim 1, wherein the first, the second and the third planetary gear sets (P1, P2, P3) are minus planetary gear sets.

15. The multiple gear transmission according to claim 1, wherein a free wheel is placed in the transmission.

16. The multiple gear transmission according to claim 1, wherein an input and an output are disposed on a same side of the housing (G).

17. The multiple gear transmission according to claim 1, wherein one of an axle differential and a transfer differential is situated upon one of an input side or an output side of the transmission.

18. The multiple gear transmission according to claim 1, wherein starting of the transmission results from engagement of one of the six shifting elements of the transmission, and the drive shaft (1) is permanently connected with a crankshaft of a prime mover.

19. The multiple gear transmission according to claim 1, wherein a torsional vibration damper is placed between a prime mover and the transmission.

20. The multiple gear transmission according to claim 1, wherein one of the drive shaft and the driven shaft has a retarder.

21. The multiple gear transmission according to claim 1, wherein upon at least one of the drive, the driven, the third, the fourth, the fifth, the sixth and the seventh shafts, power takeoff is situated for driving an additional unit.

22. The multiple gear transmission according to claim 1, wherein a power takeoff is situated upon one of the drive shaft (1) and the driven shaft (2).

23. The multiple gear transmission according to claim 1, wherein the shifting elements comprise one of force-locking brakes and clutches.

24. The multiple gear transmission according to claim 1, wherein an electric machine is mounted as an added prime mover upon one of the drive, the driven, the third, the fourth, the fifth, the sixth and the seventh shafts.

25. The multiple gear transmission according to claim 1, wherein the second and the first clutches (37, 17) are located adjacent one another.

26. The multiple gear transmission according to claim 25, wherein the second and the first clutches (37, 17) have a common outer disc carrier.

27. The multiple gear transmission according to claim 1, wherein the drive shaft (1) is separated from a prime mover by a further clutch element.

28. The multiple gear transmission according to claim 27, wherein at least one of the first, the second, the third, the fourth, the fifth and the sixth shifting elements is one of a hydrodynamic converter, a hydraulic clutch, a dry starting clutch, a wet starting clutch, a magnetic powder clutch and a centrifugal force clutch.

29. The multiple gear transmission according to claim 28, wherein an external starting element is situated in a power flow direction downstream of the transmission, and the drive shaft (1) is firmly connected with a crankshaft of the prime mover.

30. The multiple gear transmission according to claim 1, wherein the shifting elements are one of power shiftable clutches and brakes.

31. The multiple gear transmission according to claim 30, wherein the shifting elements comprise one multi-disc clutches, band brakes and tapered clutches.

32. A multiple gear transmission of a planetary design for an automatic transmission of a motor vehicle, comprising a drive shaft (1) and a driven shaft (2) located in a housing (G), first, second and third planetary gear sets (P1, P2, P3), third, fourth, fifth, sixth and seventh rotatable shafts (3, 4, 5, 6, 7), and first, second, third, fourth, fifth and sixth shifting elements (03, 04, 17, 37, 46, 56) comprising first and second brakes (03, 04) and first, second, third and fourth clutches (17, 37, 46, 56), and selective engagement of the six shifting elements (03, 04, 17, 37, 46, 56) produces different reduction ratios between the drive shaft (1) and the driven shaft (2) so that nine forward gears and one reverse gear are implemented, wherein the drive shaft (1) is permanently connected with a spider of the first planetary gear set (P1) and detachably connectable, via the first clutch (17), with the seventh shaft (7) which is connected with a sun gear of the second planetary gear set (P2), the driven shaft (2) is connected with a ring gear of the second planetary gear set (P2) and a spider of the third planetary gear set (P3), the third shaft (3) is, adjacent one end, connected with a sun gear of the first planetary gear set (P1) and, adjacent a second end, attachable to the housing (G), via the first brake (03), and detachably connectable with the seventh shaft (7), via the second clutch (37), the fifth shaft (5) is connected with a ring gear of the first planetary gear set (P1) and a sun gear of the third planetary gear set (P3) and the fifth shaft (5) is, via the fourth clutch (56), detachably connectable with the sixth shaft (6) which is connected with a spider of the second planetary gear set (P2) and, via the third clutch (46), is detachably connectable with the fourth shaft (4) connected with a ring gear of the third planetary gear set (P3), and the fourth shaft (4) is attachable to the housing (G) via the second brake (04).

* * * * *